United States Patent [19]
Nishio

[11] Patent Number: 5,521,732
[45] Date of Patent: May 28, 1996

[54] OPTICAL WAVELENGTH SELECTION CONTROL SYSTEM IN OPTICAL NETWORKS

[75] Inventor: Makoto Nishio, Tokyo, Japan

[73] Assignee: NEC Corporation, Japan

[21] Appl. No.: 255,427

[22] Filed: Jun. 8, 1994

[30] Foreign Application Priority Data

Jun. 8, 1993 [JP] Japan ..................... 5-136363

[51] Int. Cl.$^6$ .................. H04B 10/207; H04J 14/02; H04J 14/08
[52] U.S. Cl. .................. 359/120; 359/123; 359/125; 359/133; 359/136; 359/137
[58] Field of Search ..................... 359/120, 121, 359/123, 125, 135, 136, 137, 133; 370/85.3, 94.1, 94.2, 94.3

[56] References Cited

U.S. PATENT DOCUMENTS

| | | | |
|---|---|---|---|
| 4,723,309 | 2/1988 | Mochizuki et al. | 455/601 |
| 4,781,427 | 11/1988 | Husbands et al. | 350/96.16 |
| 4,797,879 | 1/1989 | Habbab et al. | 370/3 |
| 4,809,362 | 2/1989 | Claus et al. | 455/607 |
| 4,873,681 | 10/1989 | Arthurs et al. | 370/3 |
| 5,018,130 | 5/1991 | Suzuki et al. | 370/1 |
| 5,365,344 | 11/1994 | Eda et al. | 359/124 |

FOREIGN PATENT DOCUMENTS 62-126727 6/1987 Japan ..................... 359/121

OTHER PUBLICATIONS

"A Media–Access Protocol for Packet–Switched Wavelength Division Multiaccess Metropolitan Area Networks", by Mon–Song Chen et al, IEEE Journal on Selected Areas in Communications, vol. 8, No. 6, Aug. 1990, pp. 1048–1057.

Primary Examiner—Leslie Pascal
Attorney, Agent, or Firm—Ostrolenk, Faber, Gerb & Soffen

[57] ABSTRACT

An optical wavelength selection control system in an optical network includes an optical center node device and a plurality of terminal devices each comprised of a work station and an interface. The optical center node device includes a control circuit, a plurality of optical switches and a plurality of tunable wavelength filters. When there occurs a collision among the plurality of terminal devices wherein a plurality of terminal devices send simultaneously optical packets to the same terminal device, the control circuit operates to control the optical switches and the tunable wavelength filters such that they select only one optical packet, based on information relating to, for example, a data length to be transferred. The control circuit sends out an acknowledgment (ACK) signal to the terminal device whose optical packet has been selected. To each of the terminal devices whose optical packets have not been selected, the control circuit sends out, in addition to a not-acknowledgement (NACK) signal, a signal indicating a resending time schedule. There are no possibilities any more for at least these optical packets to be involved in the collision problems, and this ensures an enhancement of the throughput of the network system.

5 Claims, 4 Drawing Sheets

OPTICAL WAVELENGTH SELECTION CONTROL SYSTEM IN OPTICAL NETWORKS

BACKGROUND OF THE INVENTION (1) Field of the Invention

The present invention relates to an optical wavelength selection control system using a wavelength division multiaccess technology in optical networks.

(2) Description of the Related Art

The optical networks using optical fibers for transmission paths are expected to be increasingly widely used in the future because of such advantages that the optical fiber offers broad bandwidths allowing to transmit a large quantity of data and that the optical fiber is free from any induced noise. A conventional system of such optical networks has been reported by M. Chen et al under the title "A Media-Access Protocol for Packet-Switched Wavelength Division Multi-access Metropolitan Area Networks" in IEEE-Journal on Selected Areas in Communications, Vol. 8, No. 6, August 1990, pages 1048–1057.

FIG. 1 shows an architecture of the above conventional optical networks with three work stations (W/S). Electrical signals from the work stations 100–102 are respectively converted at optical interfaces (IF) 103–105 to optical packet signals of wavelengths $\lambda 1$, $\lambda 2$ and $\lambda 3$ which have respectively been fixed in advance, and the converted optical packet signals are sent out to an optical star coupler 106. At the optical star coupler 106, the optical packet signals from the optical interfaces 103–105 are wavelength-multiplexed, and the signals thus wavelength-multiplexed are sent back to the optical interfaces 103–105. At each of the optical interfaces 103–105, one optical packet signal of a predetermined wavelength is selected from among the optical signals in which the inputted packet signals with wavelengths $\lambda 1$, $\lambda 2$ and $\lambda 3$ are wavelength-multiplexed. The optical packet signals thus selected are converted to electrical signals which are sent out respectively to the work stations 100–102.

FIG. 2 shows details of one of the optical interfaces 103–105 used in the conventional optical networks shown in FIG. 1. The electrical packet signal from the work station concerned is inputted to a control circuit 200. The control circuit 200 sends a header portion of the electrical packet signal to a fixed wavelength light source 202 having a fixed wavelength of $\lambda c$ and a data portion to a fixed wavelength light source 201 having a fixed wavelength of $\lambda i$ which is unique to each work station. The fixed wavelength light source 202 transmits an optical header signal of the wavelength $\lambda c$ to the time slot which is unique to the work station, while the fixed wavelength light source 201 transmits an optical data signal of the wavelength $\lambda i$, and these signals are transmitted to the star coupler 106 shown in FIG. 1 through an optical combiner 203. An optical beam splitter 204 transmits to an optical signal receiver 205 an optical signal of the wavelength $\lambda c$ in which a header portion from each of the work stations is time-division-multiplexed from the wavelength multiplexed signal received from the star coupler 106, and transmits to a tunable wavelength filter 206 an optical signal in which a data portion from each of the work stations is wavelength-multiplexed. The control circuit 200 receives from the optical signal receiver 205 the optical header signals from all the work stations, determines which station has transmitted the data portion to which station as a receiver, and controls the tunable wavelength filter 206 in such a way that it selects only the optical signal of the unique wavelength assigned in advance to a work station which has sent out the data designating the work station connected to that tunable wavelength filter. The output optical signal of the tunable wavelength filter 206 is converted to an electrical signal by an optical signal receiver 207 and is transmitted to the corresponding work station.

As above, each work station transmits a data portion of the packet signal at a predetermined wavelength, and the tunable wavelength filter selects the optical signal of the predetermined wavelength, and this enables optical signal communication between any work stations.

In the above conventional wavelength selection control system in optical networks using a wavelength division multiaccess technology, when a plurality of work stations send optical packet signals to the same work station simultaneously, there occurs a collision or conflict so that the work station is controlled to select and receive only one optical packet signal of a predetermined wavelength. Then, only the success or failure in the collision is made known to each work station, that is, in the form of an acknowledgement (ACK) signal and a not-acknowledgement (NACK) signal. Thus, there are possibilities for the stations having lost in the collision to resend the optical packet signals simultaneously thereby causing a collision to occur again, which leads to the lowering of the efficiency of the network system.

SUMMARY OF THE INVENTION

An object of the invention, therefore, is to overcome the problems existing in the prior art and to provide an improved wavelength selection control system which enhances throughput of an optical network.

According to one aspect of the invention, there is provided an optical wavelength selection control system in an optical network in which a plurality of terminal devices capable of transmitting and receiving packet signals are interconnected through an optical center node device so that data communication between any to any terminal devices can be performed, each of the terminal devices operating to transmit an optical packet signal of a predetermined fixed wavelength, and the optical center node device producing wavelength-multiplexed signals in which a plurality of optical packet signals of the predetermined fixed wavelengths sent from the plurality of terminal devices are multiplexed, and forwarding an optical signal of a predetermined wavelength selected from the wavelength-multiplexed signals to a destined terminal device according to a header portion of the optical packet signal, the optical wavelength selection control system comprising:

means to select, when a plurality of packet signals destined to a same terminal device among the plurality of terminal devices are sent out simultaneously from a plurality of the terminal devices, a predetermined one from among the plurality of packet signals destined to the same terminal device; and means to send a signal indicating a resending time schedule to each of the terminal devices that has transmitted the optical packet signal which has been unselected.

In the wavelength selection control system according to the invention, when a plurality of work stations send optical packet signals to the same work station simultaneously giving a rise to a collision among them, one optical packet signal of a predetermined wavelength is selected and, at the same time, the work station(s) having lost in the collision are informed of scheduling as to when the respective packet signals may be sent again. Thus, there is no possibility as to these packet signals that they will be involved in collisions among themselves, and this ensures enhancing the throughput of the network. However, there is the possibility that these packet signals when retransmitted could collide with other first time packet signals.

BRIEF DESCRIPTION OF THE DRAWINGS

The above and other objects, features and advantages of the present invention will be apparent from the following description of preferred embodiments of the invention explained with reference to the accompanying drawings, in which.

PREFERRED EMBODIMENT OF THE INVENTION

Now, a preferred embodiment of the invention is explained with reference to the accompanying drawings.

Figure 3:
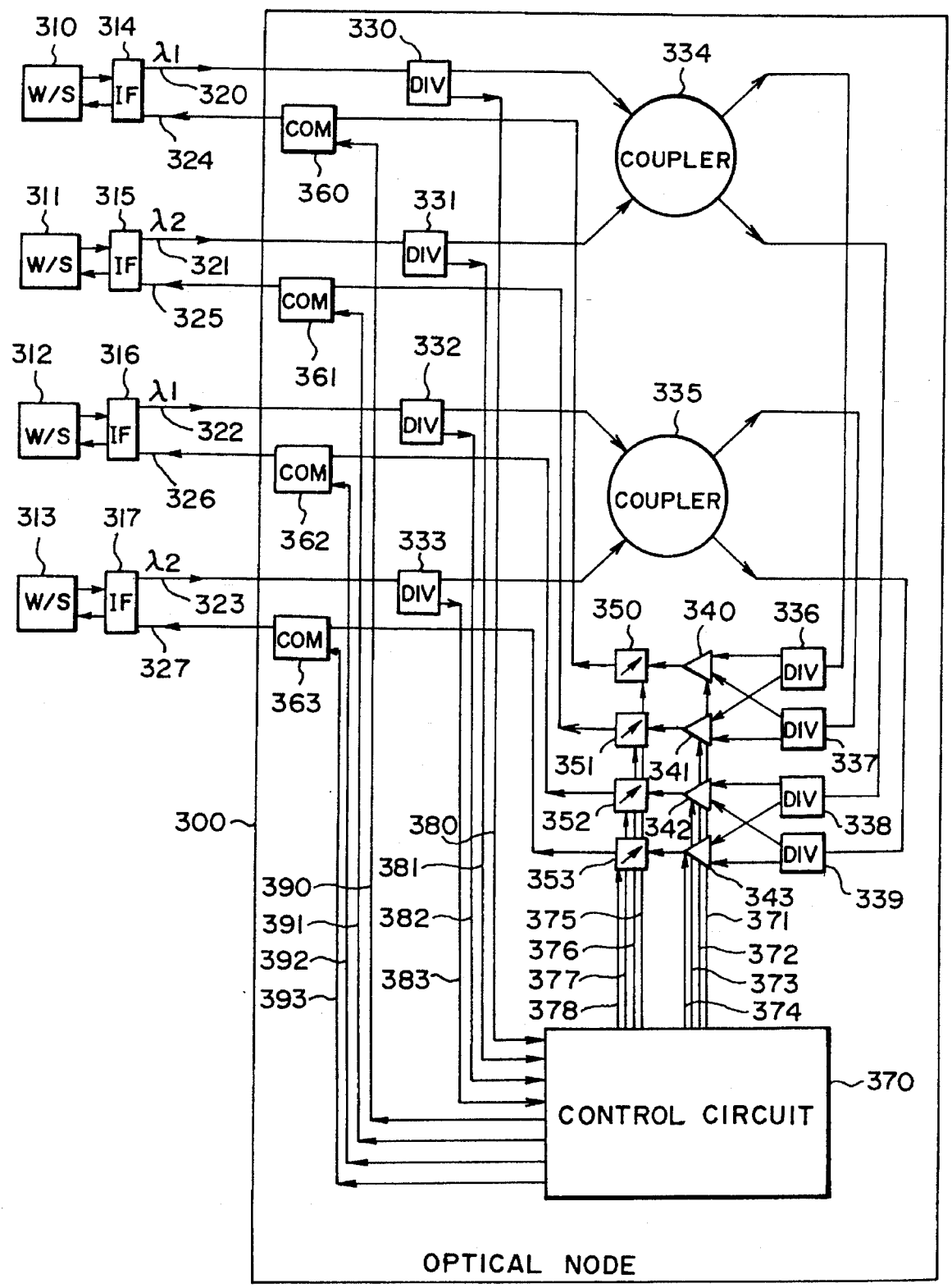
FIG. 3 is a block diagram showing an optical network of an embodiment according to the invention.

FIG. 3 shows a network diagram for explaining the optical wavelength selection system according to the invention. In the exemplified network, there are four work stations 310–313 (input and output lines being four respectively) and the wave-length division multiplexity is two. The work stations 310–313 are connected to an optical node 300 through interfaces 314–317, respectively. A combination of the work station and the interface constitutes a terminal device.

The optical node 300 comprises a control circuit 370, a plurality of optical dividers (DIV) 330–333 and 336–339, a plurality of optical star couplers 334 and 335, a plurality of optical switches 340–343, a plurality of tunable wavelength filters 350–353, and a plurality of optical combiners 360–363. Electrical signals from the work stations 310 and 312 are converted respectively at optical interfaces 314 and 316 to optical packet signals of a predetermined wavelength λ1, and the converted optical packet signals are respectively sent out to optical waveguides 320 and 322. In the same way, electrical signals from the work stations 311 and 313 are converted respectively at optical interfaces 315 and 317 to optical packet signals of a predetermined wavelength λ2, and the converted optical packet signals are sent to optical waveguides 321 and 323.

The optical packet signals from the input optical waveguides 320 and 321 are, in their large portion, transmitted to the optical star coupler 334 respectively through the optical dividers 330 and 331, and are, in their small portion, transmitted to the control circuit 370 respectively through optical waveguides 380 and 381. In the same manner, the optical packet signals from the input optical waveguides 322 and 323 are, in their large portion, transmitted to the optical star coupler 335 respectively through the optical dividers 332 and 333, and are, in their small portion, transmitted to the control circuit 370 respectively through optical waveguides 382 and 383.

At the optical star coupler 334, the optical packet signals from the optical interfaces 314 and 315 are wavelength-multiplexed, and the signals thus wavelength-multiplexed are sent to the optical dividers 336 and 338. At the optical star coupler 335, the optical packet signals from the optical interfaces 316 and 317 are wavelength-multiplexed, and the signals thus wavelength-multiplexed are sent to the optical dividers 337 and 339.

Each of the optical dividers 336 and 337 divides the wavelength-multiplexed signal to be inputted to the optical switches 340 and 341. Each of the optical dividers 338 and 339 divides the wavelength-multiplexed signal to be inputted to the optical switches 342 and 343. In response to a control signal 371 or 372 from the control circuit 370, each of the optical switches 340 and 341 sends one of the wavelength-multiplexed signals inputted thereto through the optical dividers 336 and 337 to the tunable wavelength filter 350 or 351. Also, in response to a control signal 373 or 374 from the control circuit 370, each of the optical switches 342 and 343 sends one of the wavelength-multiplexed signals inputted thereto through the optical dividers 338 and 339 to the tunable wavelength filter 352 or 353.

In accordance with control signals 375–378 from the control circuit 370, each of the tunable wavelength filters 350–353 selects one predetermined optical packet signal from the optical signals in which the wavelengths λ1 and λ2 are multiplexed and which are respectively sent from the optical switches 340–343, and sends such optical packet signal to a corresponding one of the optical combiners 360–363.

In accordance with header portions of the optical packet signals inputted from the optical waveguides 380–383, the control circuit 370 applies the control signals 371–374 to the optical switches 340–343, and it also applies the control signals 375–378 to the tunable wavelength filters 350–353. Also, the control circuit 370 produces the ACK optical signals or the NACK optical signals which indicate whether or not the packet signals from the work stations 310–313 have been selected by the optical switches 340–343 and the tunable wavelength filters 350–353 and sends such signals to the optical combiners 360–363 through the optical waveguides 390–393. The optical signals from the tunable wavelength filters 350–353 and the ACK and NACK optical signals received from the control circuit 370 through the optical waveguides 390–393 are combined by the respective optical combiners 360–363 and are then sent to the optical interfaces 314–317 through output optical waveguides 324–327. The optical interfaces 314–317 convert the received optical signals to electrical signals and send the converted signals to the work stations 310–313.

Figure 1:
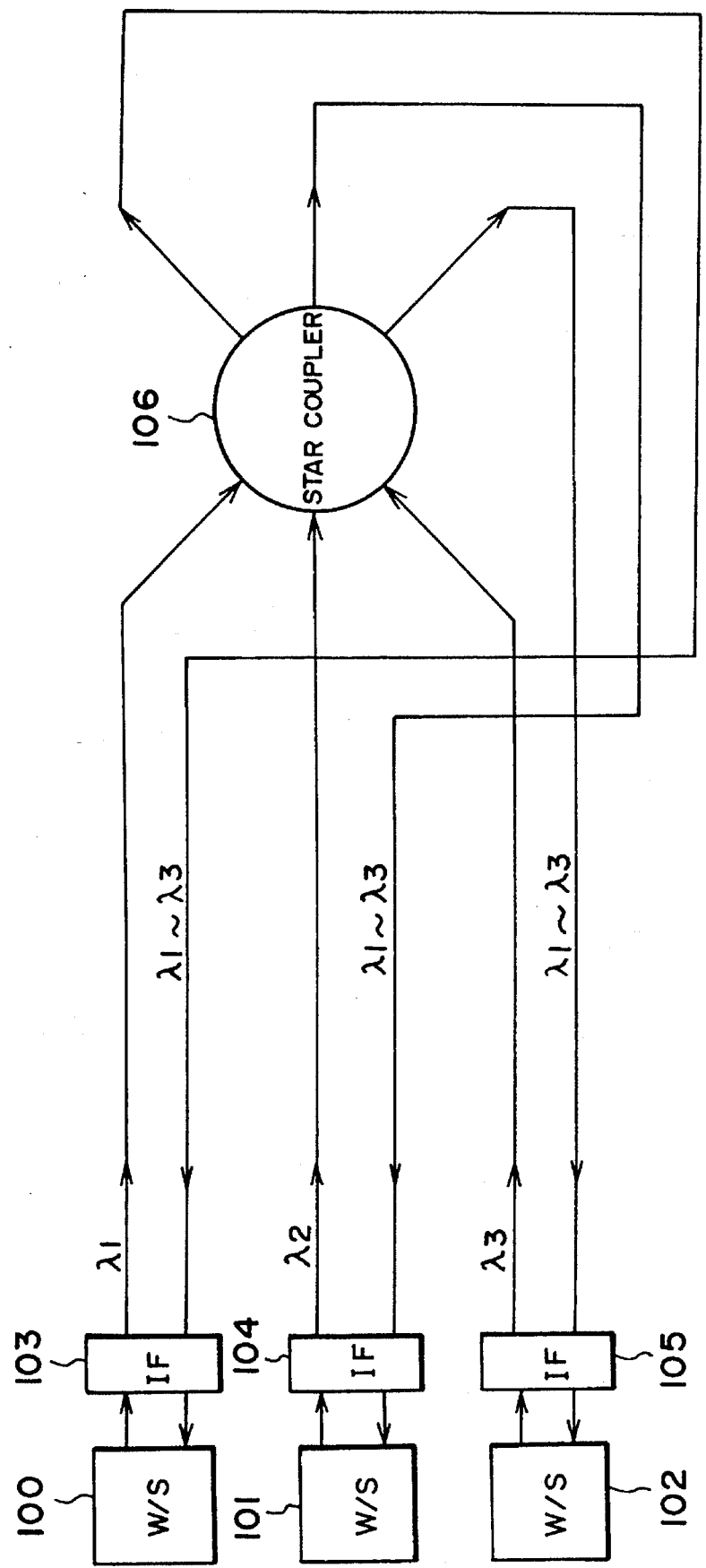
FIG. 1 is a block diagram showing an architecture of a conventional optical network with three work stations.
Figure 2:
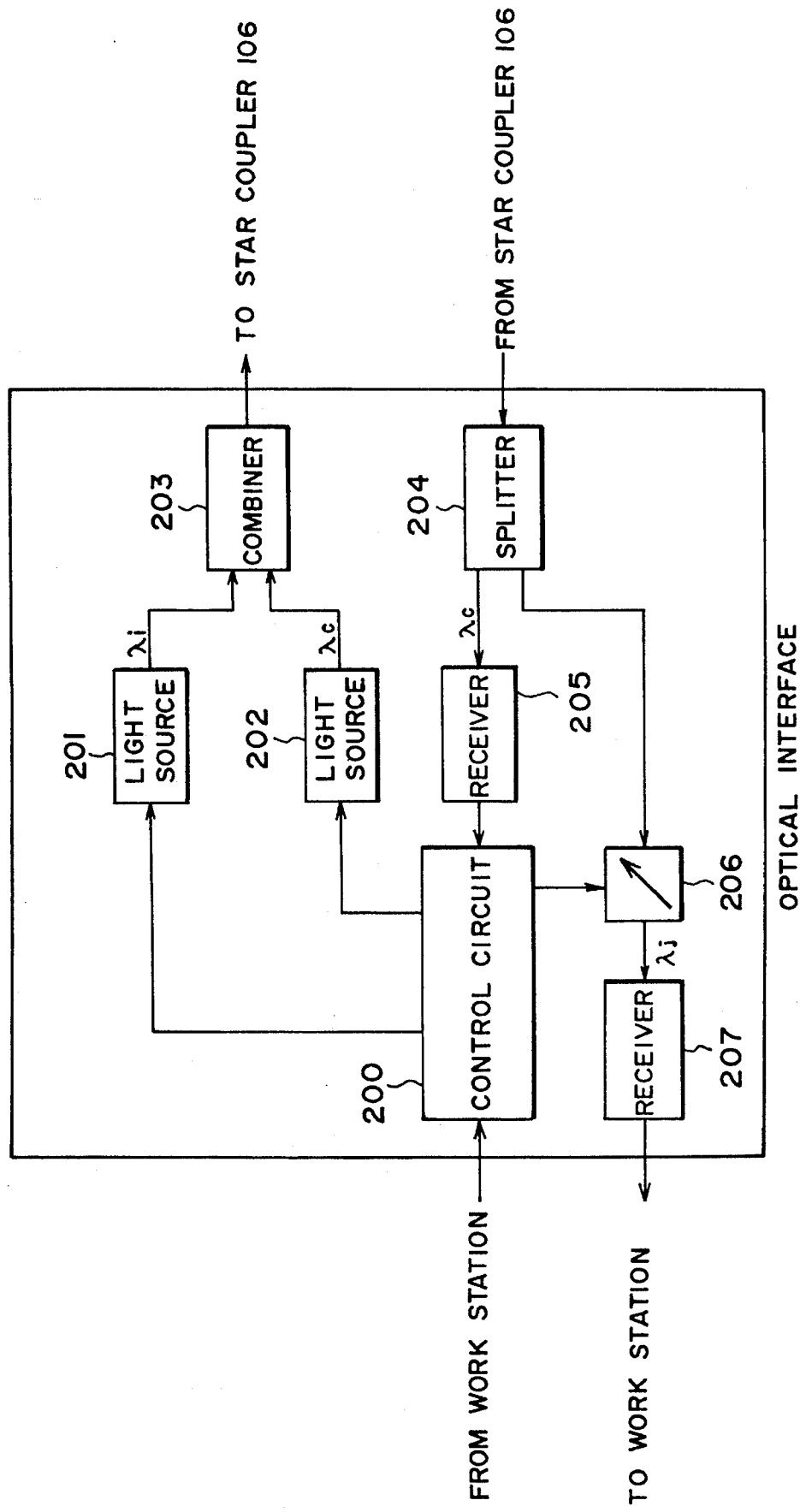
FIG. 2 is a block diagram showing details of an optical interface used in the optical network shown in FIG. 1.

For the optical interfaces 314–317, it is possible to use the conventional optical interface shown in FIG. 2. In such a case, by using wavelength demultiplexers instead of the optical dividers 330–333 shown in FIG. 3, it is possible to divide out the λc wavelength optical signal of a header portion to the control circuit 370. If the control circuit 370 is so designed as to receive only the header portion of the optical packet signal divided out by the optical dividers 330–333, it is possible to send to the optical node 300 the header and data portions of the optical packet signal as the signals of the same wavelength. In this way, the fixed wavelength light source 202 of the interface shown in FIG. 2 can be dispensed with.

Thus, in the optical network system shown in FIG. 3, according to the control signals from the control circuit 370, the optical switches 340–343 switch or select predetermined wavelength-multiplexed signals to be inputted to the tunable wavelength filters 350–353, and the tunable wavelength filters 350–353 select optical signals of the predetermined wavelengths, thereby enabling the optical communication, that is, data transmission and reception between any work stations 310–313.

Figure 4:
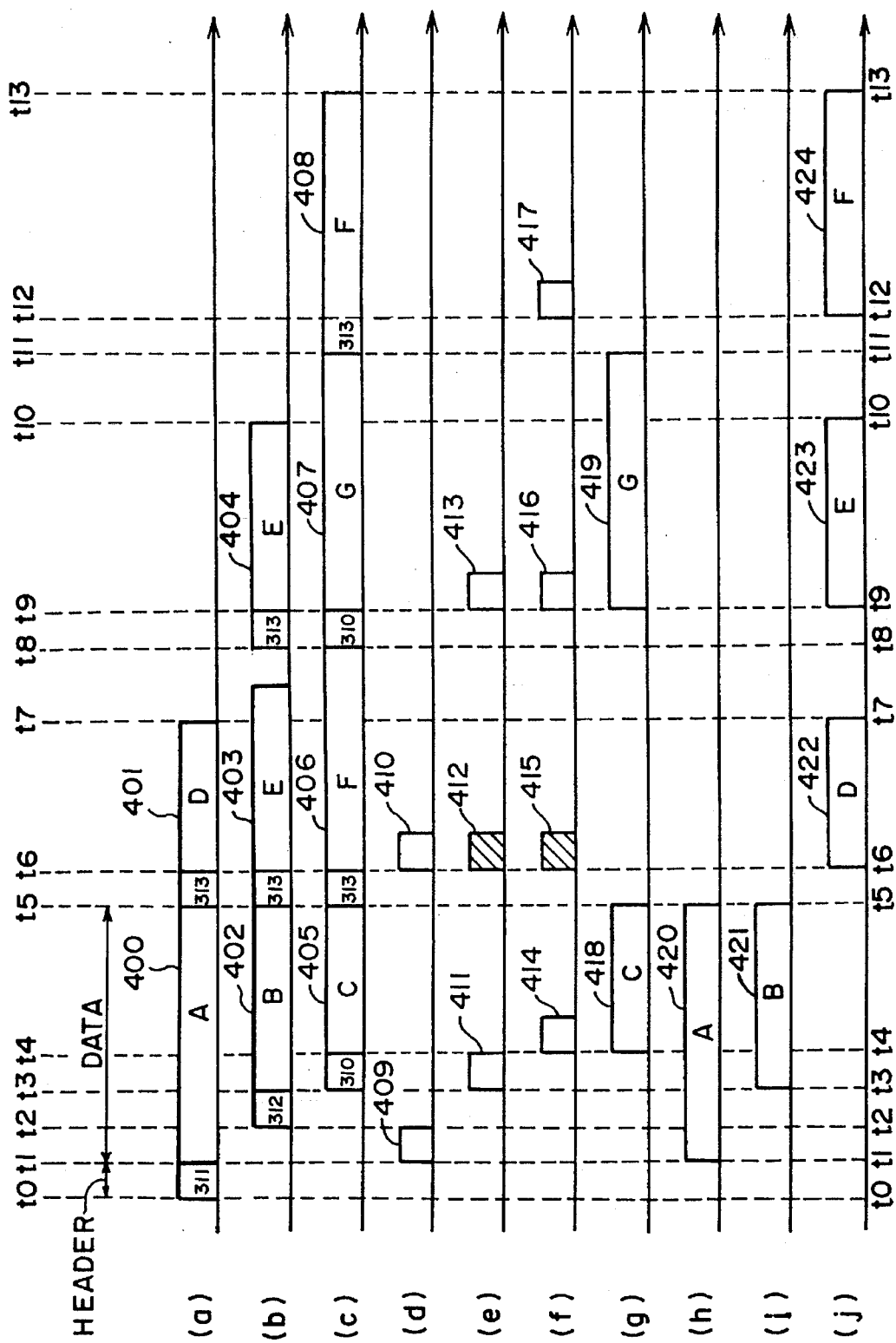
FIG. 4 is a timing chart for explaining a wavelength selection control system used in the optical network shown in FIG. 3.

FIG. 4 is a timing chart for explaining a wavelength selection control system for carrying out the transmission and reception of optical packet signals between the work stations in the optical network according to the invention.

In FIG. 4,(a)–(j) indicate as follows:

(a) indicates an optical packet signal (wavelength λ1) from the work station 310, (b) indicates an optical packet signal (wavelength λ2) from the work station 311, (c) indicates an optical packet signal (wavelength λ1) from the work station 312, (d) indicates an ACK/NACK signal destined to the work station 310, (e) indicates an ACK/NACK signal destined to the work station 311, (f) indicates an ACK/NACK signal destined to the work station 312, (g) indicates a switching sequence of the switch 340 and the tunable wavelength filter 350 which are for the work station 310, (h) indicates a switching sequence of the switch 341 and the tunable wavelength filter 351 which are for the work station 311, (i) indicates a switching sequence of the switch 342 and the tunable wavelength filter 352 which are for the work station 312, and (j) indicates a switching sequence of the switch 343 and the tunable wavelength filter 353 which are for the work station 313.

In the example shown in FIG. 4, variable-length optical packet signals 400 and 401 of wavelength λ1 outputted from the work station 310 reach the optical node 300 in FIG. 3 respectively at time t0 and time t5. Also, variable-length optical packet signals 402, 403 and 404 of wavelength λ2 sent out from the work station 311 reach the optical node 300 respectively at time t2, time t5 and time t8. Further, variable-length optical packet signals 405–408 of wavelength λ1 sent out from the work station 312 reach the optical node 300 in FIG. 3 respectively at time t3, time t5, time t8 and time t11. Each of the optical packet signal consists of a header portion and a data portion, the header portion carrying destination address information and data length information. The numbers written at the header portions in FIG. 4 are the numbers of the work stations to which the optical packet signals are destined.

The header portion of the optical packet signal 400 which is outputted from the work station 3101 and which is destined to the work station 311 is processed at the control circuit 370 shown in FIG. 3, and the ACK signal 409 is returned from the control circuit 370 to the work station 310 at time t1 as indicated in the ACK/NACK signal destined to the work station 310. Then, as indicated in the switching sequence 420 of the optical switch 341 and the tunable wavelength filter 351 which are for the work station 311 (FIG. 3), the data portion A of the optical packet signal 400 of wavelength λ1 is selected during a period between time t1 and time t5 and is sent out to the destined work station 311.

The header portion of the optical packet signal 402 which is outputted from the work station 311 and which is destined to the work station 312 is processed at the control circuit 370, and the ACK signal 411 is returned from the control circuit 370 to the work station 311 at time t3 according to the indication in the ACK/NACK signal destined to the work station 311. Then, as indicated in the switching sequence 421 of the optical switch 342 and the tunable wavelength filter 352 which are for the work station 312 (FIG. 3), the data portion B of the optical packet signal 402 of wavelength λ2 is selected during a period between time t3 and time t5 and is sent out to the destined work station 312.

The header portion of the optical packet signal 405 which is outputted from the work station 312 and which is destined to the work station 310 is processed at the control circuit 370, and the ACK signal 414 is returned from the control circuit 370 to the work station 312 at time t4 according to the indication in the ACK/NACK signal destined to the work station 312. Then, as indicated in the switching sequence 418 of the optical switch 340 and the tunable wavelength filter 350 which are for the work station 310, the data portion C of the optical packet signal 405 of wavelength λ1 is selected during a period between time t4 and time t5 and is sent out to the work station 310.

Since the work stations 310, 311 and 312 respectively send out the next optical packet signals before receiving respectively the ACK signals 409, 411 and 414, the optical packet signals 401, 403 and 406 respectively of wavelengths λ1, λ2 and λ1 arrive at the optical node 300 simultaneously at time t5.

The header portions of the optical packet signals 401, 403 and 406 outputted from the work stations 310–312 to be processed by the control circuit 370 (FIG. 3) are all destined to the work station 313, and here a collision among these optical packet signals arises. When such collision occurs among a plurality of optical packet signals, the control circuit 370 controls the optical switch and the tunable wavelength filter for the destined work station so as to select only one of the optical packet signals in collision. In the example of FIG. 4, the control circuit 370 selects the optical packet signal 401 from the work station 310 from among the work stations 310–312 and returns the ACK signal 410 to the work station 310 at time t6 as indicated in the ACK/NACK signal destined to the work station 310. To the work stations 311 and 312, the NACK signals are returned as explained later. Then, as indicated in the switching sequence 422 of the optical switch 343 and the tunable wavelength filter 353 which are for the work station 313, the data portion D of the optical packet signal 401 of wavelength λ1 is selected during a period between time t6 and time t7 and is sent out to the destined work station 313.

The control circuit 370 here calculates the time at which the work stations 311 and 312 should resend the optical packet signals 403 and 406. This calculation is made based on a comparison between the length of the data carried by the header portion of the optical packet signal 401 succeeded in the collision and the lengths of the data E and F of the optical packet signals 403 and 406 failed in the collision. In this example, it is so decided in the control circuit 370 that the packet signal 403 which has shorter data length than that of the packet signal 406 should be resent earlier than the packet signal 406. Based on the NACK signals 412 and 415 returned at time t6 from the control circuit 370, the work stations 311 and 312 are respectively informed of the times for the optical packet signals 403 and 406 to be resent.

Upon receipt of the NACK signals issued from the control circuit 370, the work stations 311 and 312 send out the optical packet signals again based thereon. In FIG. 4, the control circuit 370 informs each of the work stations 311 and 312 through each of the NACK signals 412 and 415 as to the time for resending so that the resending by the work station 311 precedes that by the work station 312. Thus, according to the NACK signal 412 received, the work station 311 resends the optical packet signal 404 having the same content as that included in the packet signal 403 in such a way that it reaches the optical node 300 at time t8 after the data portion D of the optical packet signal 401 has been selected.

The header portion of the optical packet signal 404 resent from the work station 311 is processed at the control circuit 370 and, according to the indication in the ACK/NACK signal destined to the work station 311, the ACK signal 413 is returned from the control circuit 370 to the work station 311 at time t9. Then, as indicated in the switching sequence 423 of the optical switch 343 and the tunable wavelength filter 353 which are for the work station 313, the data portion E of the optical packet signal 404 of wavelength λ2 is selected during a period between time t9 and time t10 and is sent out to the work station 313.

According to the NACK signal 415 received, the work station 312 resends the same optical packet signal 408 as the optical packet signal 406 after the work station 311 has resent the optical packet signal 404. This means that the work station 312 can resend the next optical signal packet 407 while the work station 311 is resending the optical packet signal 404. The optical packet signal 407 arrives at the optical node 300 at time t8.

The header portion of the optical packet signal 407 which is outputted from the work station 312 and which is destined to the work station 310 is processed at the control circuit 370, and the ACK signal 416 is returned from the control circuit 370 to the work station 312 at time t9 as indicated in the ACK/NACK signal destined to the work station 312. Then, as indicated in the switching sequence 419 of the optical switch 340 and the tunable wavelength filter 350 which are for the work station 310, the data portion G of the optical packet signal 407 of wavelength λ1 is selected during a period between time t9 and time t11 and is sent out to the destined work station 310.

The work station 312 resends the same optical packet signal 408 as the optical packet signal 406 after having sent the optical packet signal 407. Thus, the optical packet signal 408 reaches the optical node 300 at time t11.

The header portion of the optical packet signal 408 which has been resent from the work station 312 is processed at the control circuit 370 and, according to the indication in the ACK/NACK signal destined to the work station 312, the ACK signal 417 is returned from the control circuit 370 to the work station 312 at time t12. Then, as indicated in the switching sequence 424 of the optical switch 343 and the tunable wavelength filter 353 which are for the work station 313, the data portion F of the optical packet signal 408 of wavelength λ1 is selected during a period between the t12 and time t13 and is sent out to the destined work station 313.

As understood from the timing charts shown in FIG. 4, when the collision occurs among a plurality of optical packet signals, a predetermined optical packet signal is selected, and the work station having sent the optical packet signal and having failed in the collision is informed of scheduling as to when that optical packet signal should be resent.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. An optical wavelength selection control system in an optical network in which a plurality of terminal devices capable of transmitting and receiving packet signals are interconnected through an optical center node device for performing data communication between any of said terminal devices, each of said terminal devices being adapted to transmit an optical packet signal of a predetermined fixed wavelength, and said optical center node device being adapted to produce wavelength-multiplexed signals in which a plurality of optical packet signals of said predetermined fixed wavelengths from said plurality of terminal devices are multiplexed, and being further adapted to forward an optical signal of a predetermined wavelength selected from said wavelength-multiplexed signals to a destined terminal device according to a header portion of said optical packet signal, said optical wavelength selection control system comprising:

means to select, when a plurality of packet signals are simultaneously transmitted from a plurality of said terminal devices to one of said terminal devices, a predetermined one of said packet signals from among said plurality of packet signals destined to said one terminal device; and means to send a signal indicating a resending time schedule to each of said terminal devices that transmitted an optical packet signal which was not selected;

said means to select and said means to send being in said optical center node devices.

2. The optical wavelength selection control system according to claim 1, in which said resending time schedule is determined based on a calculation of a length of the data to be resent.

3. The optical wavelength selection control system according to claim 1, in which said resending time schedule is sent with a not-acknowledgement (NACK) signal to each of said terminal devices that transmitted the optical packet signal which was not selected.

4. The optical wavelength selection control system according to claim 1, in which said means to send a signal indicating the resending time schedule also sends an acknowledgment (ACK) signal to a terminal device which has sent said selected optical packet signal.

5. The optical wavelength selection control system according to claim 1, in which said means to select and said means to send comprises:

a control circuit;

a plurality of optical switches coupled to said control circuit; and a plurality of tunable wavelength filters also coupled to said control circuit, said control circuit being operative to control said optical switches and said tunable wavelength filters such that, when a collision occurs among a plurality of optical packets from said plurality of terminal devices, one packet signal in the collision of packet signals is selected by an acknowledgment (ACK) signal being sent to the terminal device having sent said selected packet signal and, at the same time, a not-acknowledgment (NACK) signal being sent to each of other terminal devices, said not-acknowledgment signal indicating a time at which each of the packet signals in the collision that were not selected are to be resent.

* * * * *